United States Patent
Zheng et al.

(10) Patent No.: US 11,486,278 B2
(45) Date of Patent: Nov. 1, 2022

(54) EXTENDED ORIFICE PLUG FOR A FLUID SYSTEM

(71) Applicant: Raytheon Technologies Corporation, Farmington, CT (US)

(72) Inventors: Zhijun Zheng, Avon, CT (US); Holly Teufel, Taylorsville, UT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/115,304

(22) Filed: Dec. 8, 2020

(65) Prior Publication Data
US 2022/0178281 A1 Jun. 9, 2022

(51) Int. Cl.
*F01M 11/04* (2006.01)
*F16L 55/11* (2006.01)

(52) U.S. Cl.
CPC ...... *F01M 11/0408* (2013.01); *F16L 55/1108* (2013.01); *F01M 2011/0416* (2013.01)

(58) Field of Classification Search
CPC ....... F01M 11/0408; F01M 2011/0416; F01M 2011/0425; F16L 55/11; F16L 55/1108; F16L 55/1152; F16K 1/04; F16K 1/02
See application file for complete search history.

(56) References Cited

U.S. PATENT DOCUMENTS

| | | | | |
|---|---|---|---|---|
| 1,583,050 A * | 5/1926 | Keller | ................. | F16K 1/04 251/359 |
| 1,645,046 A * | 10/1927 | Gallagher | ............. | F22B 37/223 220/288 |
| 2,358,612 A * | 9/1944 | Acker | ................. | B03C 1/284 210/222 |
| 2,625,955 A * | 1/1953 | Day | .................... | F16L 55/1152 138/89 |
| 3,434,694 A * | 3/1969 | Skinner | ................. | F16K 1/04 251/215 |
| 4,119,178 A * | 10/1978 | Hass | ................ | F01M 11/0408 184/1.5 |
| 4,659,115 A * | 4/1987 | Cameron | ............... | E21B 17/02 285/12 |
| 4,921,281 A * | 5/1990 | Taylor | ................ | F16L 55/1108 285/90 |
| 4,923,221 A * | 5/1990 | Taylor | ................ | F16L 55/1152 285/81 |

(Continued)

FOREIGN PATENT DOCUMENTS

EP 3081773 B1 12/2018
WO WO-2010144962 A1 * 12/2010 .......... F16L 55/1108

OTHER PUBLICATIONS

EP search report for EP21213239.1 dated May 3, 2022.

*Primary Examiner* — David Colon-Morales
(74) *Attorney, Agent, or Firm* — Getz Balich LLC

(57) ABSTRACT

An assembly is provided for a fluid system. This fluid system assembly includes a fluid conduit and a plug. The fluid conduit has an internal bore. The internal bore is configured as or otherwise includes a smooth-walled internal bore. The plug includes a protrusion and a head. The protrusion is connected to the head. The protrusion projects axially along an axial centerline partially into the smooth-walled internal bore to a distal end of the plug. The head is seated against the fluid conduit. The head seals an opening in the fluid conduit to the internal bore.

14 Claims, 9 Drawing Sheets

(56) References Cited

U.S. PATENT DOCUMENTS

| | | | | |
|---|---|---|---|---|
| 5,320,238 | A * | 6/1994 | Verdesca | F16L 55/11 |
| | | | | 220/240 |
| 6,427,427 | B1 * | 8/2002 | Dietz | F01M 11/0408 |
| | | | | 56/1 |
| 7,357,225 | B2 * | 4/2008 | Dorian | F01M 11/0408 |
| | | | | 184/1.5 |
| 8,186,921 | B2 * | 5/2012 | Lowman | F01M 11/0408 |
| | | | | 411/371.1 |
| 8,657,145 | B2 * | 2/2014 | Stobbart | F17C 13/06 |
| | | | | 220/582 |
| 8,701,915 | B2 * | 4/2014 | Stevenson | F01M 11/0408 |
| | | | | 220/233 |
| 8,701,916 | B2 * | 4/2014 | Cook | F01M 11/0408 |
| | | | | 220/235 |
| 8,783,497 | B2 * | 7/2014 | Sakai | F16J 13/12 |
| | | | | 220/284 |
| 2010/0276425 | A1 | 11/2010 | Stobbart | |
| 2011/0197349 | A1 * | 8/2011 | Lee | F01M 11/0408 |
| | | | | 4/295 |
| 2012/0085453 | A1 | 4/2012 | Lourigan | |
| 2012/0318799 | A1 * | 12/2012 | Spix | F16B 37/061 |
| | | | | 220/304 |
| 2015/0122342 | A1 | 5/2015 | Ismert | |
| 2020/0248813 | A1 * | 8/2020 | Carlsson Bohm | F16J 15/344 |

* cited by examiner

EXTENDED ORIFICE PLUG FOR A FLUID SYSTEM

BACKGROUND OF THE DISCLOSURE

1. Technical Field

This disclosure relates generally to a fluid system and, more particularly, to an orifice plug.

2. Background Information

A gas turbine engine includes various fluid systems such as a lubrication system. The lubrication system may include a lubricant reservoir within a case. The case may include a drain orifice in its sidewall for draining lubricant from the lubricant reservoir for maintenance, inspection, etc. The drain orifice may be plugged with an orifice plug such as a threaded fastener; e.g., a bolt. While known orifice plugs have various advantages, there is still room in the art for improvement.

SUMMARY OF THE DISCLOSURE

According to an aspect of the present disclosure, an assembly is provided for a fluid system. This fluid system assembly includes a fluid conduit and a plug. The fluid conduit has an internal bore. The internal bore is configured as or otherwise includes a smooth-walled internal bore. The plug includes a protrusion and a head. The protrusion is connected to the head. The protrusion projects axially along an axial centerline partially into the smooth-walled internal bore to a distal end of the plug. The head is seated against the fluid conduit. The head seals an opening in the fluid conduit to the internal bore.

According to another aspect of the present disclosure, another assembly is provided for a fluid system. This fluid system assembly includes a fluid conduit with an internal bore. The fluid system assembly also includes a plug and a nut. The plug includes a protrusion and a head. The protrusion is connected to the head. The protrusion projects at least partially into the internal bore. The head is seated against the fluid conduit. The head seals an opening in an end of the fluid conduit to the internal bore. The nut secures the plug to the fluid conduit. The head projects through an aperture in the nut.

According to still another aspect of the present disclosure, another assembly is provided for a fluid system. This fluid system assembly includes a fluid conduit with an internal bore. The fluid system assembly also includes a plug, an annular seal element and a nut. The plug includes a protrusion and a head. The protrusion projects out from the head at least partially into the internal bore. The head is seated against an end of the fluid conduit. The head seals an opening in the end of the fluid conduit to the internal bore. The annular seal element is within the internal bore. The annular seal element provides a seal interface between the protrusion and the fluid conduit. The nut secures the plug to the fluid conduit.

The head may include a wrenching feature configured with one or more flats.

The protrusion may project axially along an axial centerline out from the head and partially into the internal bore to a distal end of the plug.

At least a portion (or an entirety) of the protrusion may be twisted and may have a polygonal cross-sectional geometry.

The fluid system assembly may also include an annular seal element configured with the protrusion within the internal bore. The annular seal element may seal a gap between the protrusion and the fluid conduit.

The protrusion may include a cylindrical surface that extends axially along at least seven-tenths of a length of the protrusion from the head to the distal end of the plug.

The fluid system assembly may also include an annular seal element within the internal bore. The annular seal element may seal a gap between the protrusion and the fluid conduit.

The annular seal element may be configured as or otherwise include an O-ring.

The annular seal element may be seated in a groove in the protrusion.

At least a portion (or an entirety) of the protrusion may be twisted about the axial centerline.

At least a portion (or an entirety) of the protrusion may have a polygonal cross-sectional geometry.

The polygonal cross-sectional geometry may be a rectangular cross-sectional geometry.

The plug may also include a flexible wire bristle pack arranged within the internal bore and attached to the protrusion.

At least a portion (or an entirety) of the axial centerline may be non-straight. The protrusion may be configured from or otherwise include flexible material.

The head may include a wrenching feature.

The fluid system assembly may also include a nut securing the plug to the fluid conduit. The head may project axially through an aperture in the nut towards the wrenching feature.

The head may be seated against the fluid conduit at a cone seal interface.

The fluid system assembly may also include a nut securing the plug to the fluid conduit.

The nut may include a sleeve and an inner rim. The sleeve may be mated with the fluid conduit at a threaded interface. The head may be sandwiched axially between the inner rim and an end of the fluid conduit.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
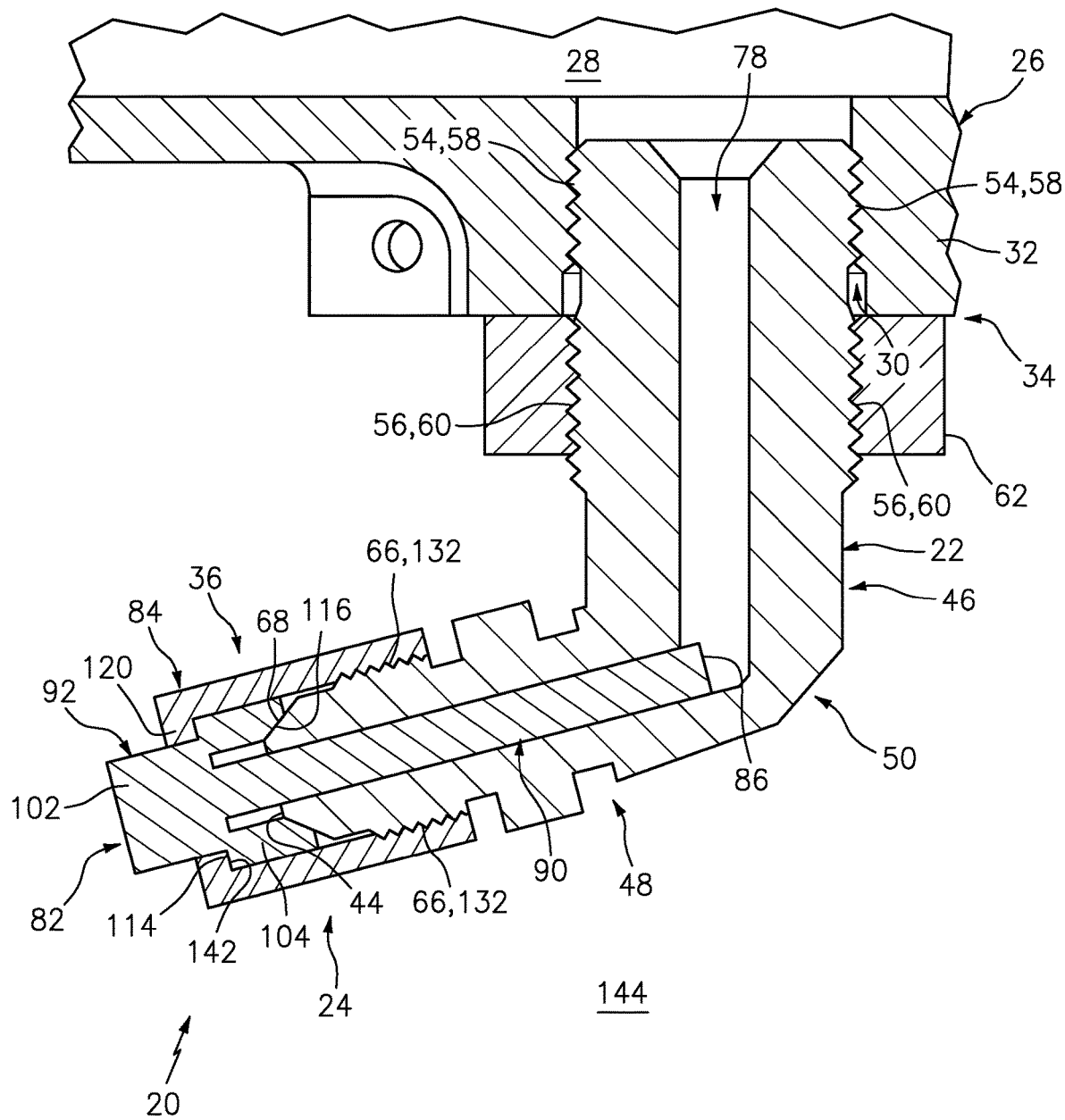
FIG. 1 is a partial side sectional illustration of an assembly for a fluid system.

FIG. 1 illustrates an assembly 20 for a fluid system. This fluid system may be configured as a lubrication system included in or otherwise configured with, for example, a piece of rotational equipment such as a gas turbine engine. The present disclosure, however, is not limited to such an exemplary fluid system. The fluid system, for example, may also or alternatively be configured as a cooling system, a heating system, a fuel system and/or a fluid actuated system (e.g., hydraulic system) in the gas turbine engine. Furthermore, the present disclosure is not limited to gas turbine engine nor rotational equipment applications. The fluid system, for example, may alternatively be included in or otherwise configured with a wind turbine, a water turbine, a transmission or any other apparatus with a pluggable fluid passage (e.g., a reservoir, a heat exchanger, etc.).

The fluid system assembly 20 includes a fluid conduit 22 and a fluid conduit plug assembly 24. The fluid system assembly 20 of FIG. 1 also includes a fluid system structure 26 (e.g., a case) with an internal fluid reservoir 28; e.g., a lubricant reservoir, etc.

The fluid conduit 22 may be configured as a drain extension and/or an extension spout for the fluid reservoir 28. The fluid conduit 22 of FIG. 1, for example, is configured to functionally relocate an aperture 30 (e.g., a drain orifice) in a sidewall 32 of the fluid system structure 26 from a first location 34 to a second location 36; e.g., a more accessible location.

Figure 2:
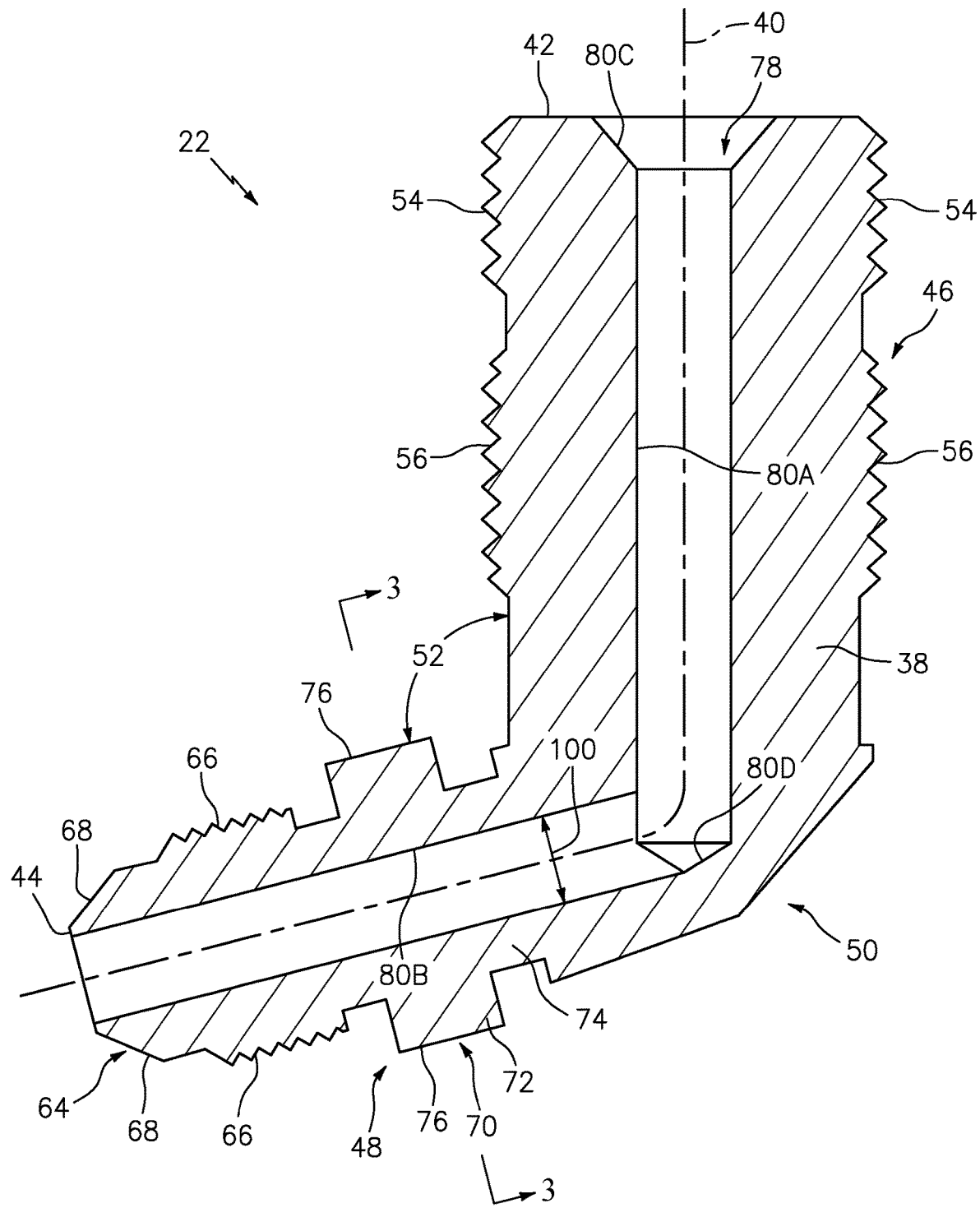
FIG. 2 is a side sectional illustration of a fluid conduit.

Referring to FIG. 2, the fluid conduit 22 of is configured as a length of (e.g., rigid, non-flexible) pipe and/or tubing. The fluid conduit 22 includes a tubular sidewall 38 that extends circumferentially about (e.g., completely around) an axial centerline 40. The fluid conduit 22 and its tubular sidewall 38 extend axially along the axial centerline 40 from a first (e.g., upstream and/or gravitationally upper) end 42 of the fluid conduit 22 to a second (e.g., downstream and/or gravitationally lower) end 44 of the fluid conduit 22.

The fluid conduit 22 and its axial centerline 40 may be straight or non-straight (e.g., bent, curved, etc.) depending upon, for example, the specific fluid system application and/or the aperture relocation requirements. The fluid conduit 22 of FIG. 2, in particular, is a non-straight conduit. This fluid conduit 22 includes a first (e.g., upstream and/or gravitationally upper) conduit portion 46, a second (e.g., downstream and/or gravitationally lower) conduit portion 48 and an intermediate (e.g., coupling, elbow) conduit portion 50. The intermediate conduit portion 50 is axially between and is connected to (e.g., formed integral with) the first conduit portion 46 and the second conduit portion 48. The first conduit portion 46 is angularly offset from the second conduit portion 48 by an included angle 52; e.g., an obtuse angle, a right angle or an acute angle. Each of the conduit portions 46 and 48 may be straight. Thus, a portion of the axial centerline 40 within each conduit portion 46, 48 may be straight.

The first conduit portion 46 of FIG. 2 includes one or more external threads 54 and 56. The first external thread 54 is arranged at (e.g., on, adjacent or proximate) the conduit first end 42. The second external thread 56 is arranged axially next to (e.g., but spaced axially from) the first external thread 54.

Referring to FIG. 1, the first external thread 54 is configured to mate with an internal thread 58 of the fluid system structure 26 within the sidewall aperture 30. The first conduit portion 46 may thereby be thread (e.g., partially) into the sidewall aperture 30 to attach (e.g., mechanically fasten) the fluid conduit 22 to the fluid system structure 26 and its sidewall 32.

The second external thread 56 is configured to mate with an internal thread 60 of a jam nut 62. This jam nut 62 may be used to rotationally lock the fluid conduit 22 relative to the fluid system structure 26 and its sidewall 32. The jam nut 62 may thereby prevent (e.g., unintentional) decoupling of the fluid conduit 22 from the fluid system structure 26 during fluid system operation.

Referring to FIG. 2, the second conduit portion 48 includes a fluid coupling portion 64 (e.g., a nipple) and an external thread 66. The fluid coupling portion 64 is arranged at (e.g., on, adjacent or proximate) the conduit second end 44. The fluid coupling portion 64 of FIG. 2 is configured with an annular tapered (e.g., a frustoconical) surface 68. This tapered surface 68 tapers radially inward towards the axial centerline 40 as the fluid coupling portion 64 extends axially towards (or to) the conduit second end 44. The external thread 66 is arranged axially next to, but may be spaced axially from, the fluid coupling portion 64.

Figure 3:
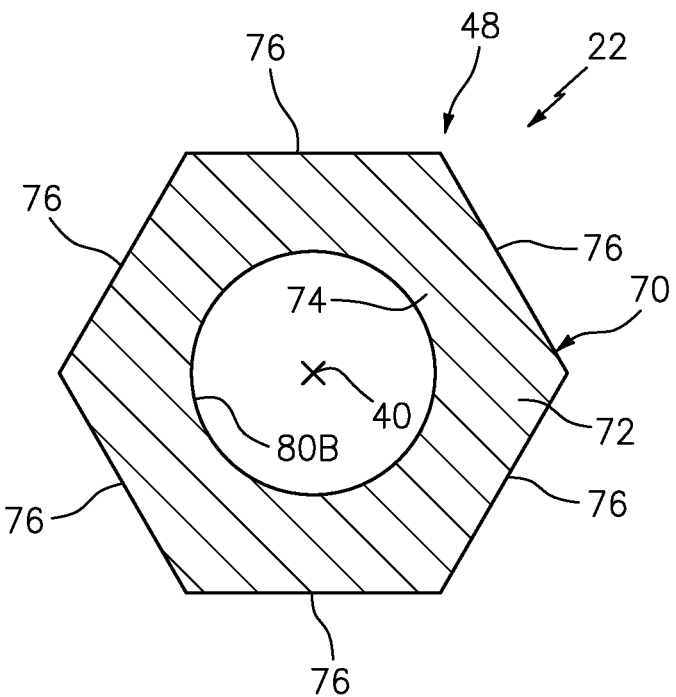
FIG. 3 is a cross-sectional illustration of the fluid conduit taken along line 3-3 in FIG. 2.

The second conduit portion 48 of FIG. 2 may also include a wrenching feature 70. This wrenching feature 70 may be configured as a flange 72 (e.g., an annular rim) which extends circumferentially about (e.g., completely around) a base 74 of the fluid conduit 22. The flange 72 is connected to (e.g., formed integral with) and projects radially out from the fluid conduit base 74 to a distal outer periphery of the flange 72. The distal outer periphery may be formed by one or more flats 76; e.g., flat, planar surfaces. The flats 76 of FIG. 3 are arranged circumferentially about the axial centerline 40 to provide the flange 72 with a polygonal (e.g., a hexagonal) cross-sectional geometry when viewed, for example, in a plane perpendicular to the axial centerline 40.

Referring to FIG. 2, the fluid conduit 22 is configured with an internal bore 78. This internal bore 78 forms a fluid passage through the fluid conduit 22. In particular, the internal bore 78 extends axially along the axial centerline 40 through the fluid conduit 22 from the conduit first end 42 to the conduit second end 44. At least a portion or an entirety of the internal bore 78 may be configured as a smooth-walled (e.g., non-threaded, non-textured, etc.) internal bore. The internal bore 78 of FIG. 2, for example, is formed by one or more smooth surfaces; e.g., surfaces without threads. The smooth surfaces of FIG. 2 include first and second smooth cylindrical surfaces 80A-B, a smooth frustoconical surface 80C and a partially-conical surface 80D. The present disclosure, however, is not limited to such an exemplary smooth-walled internal bore. For example, in other embodiments, at least an end portion of the internal bore 78 may be formed with an internal thread for a threaded coupling; thus, non-smooth-walled.

Figure 4:
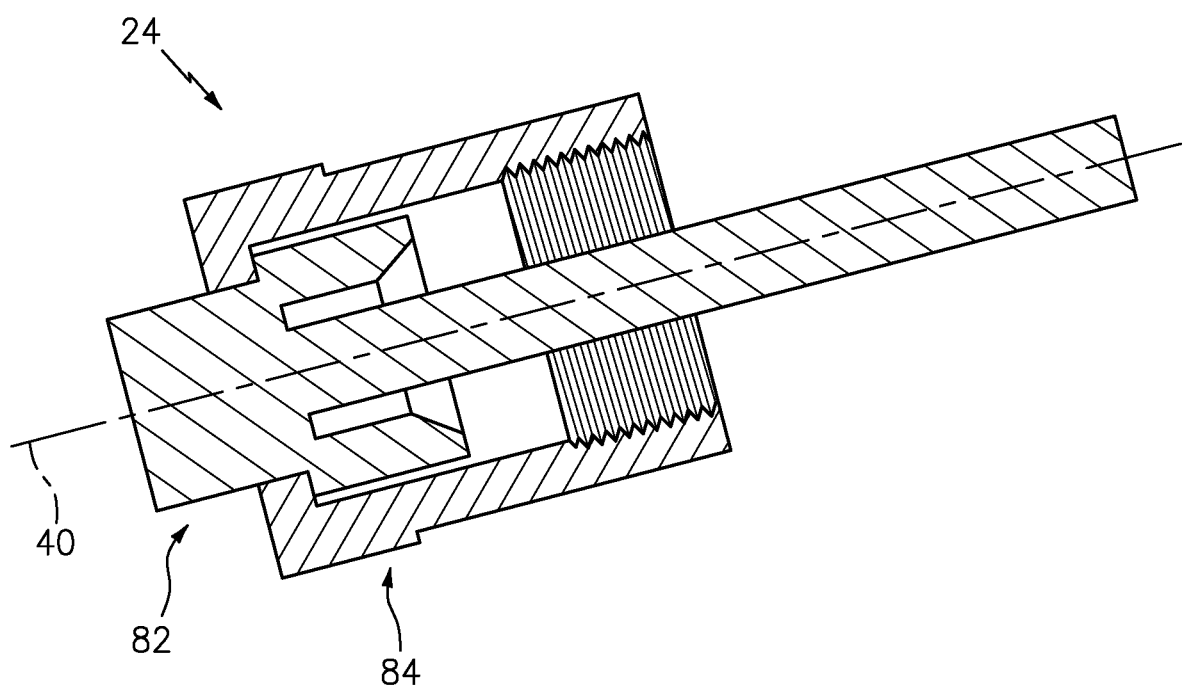
FIG. 4 is a side sectional illustration of a plug assembly.
Figure 5:
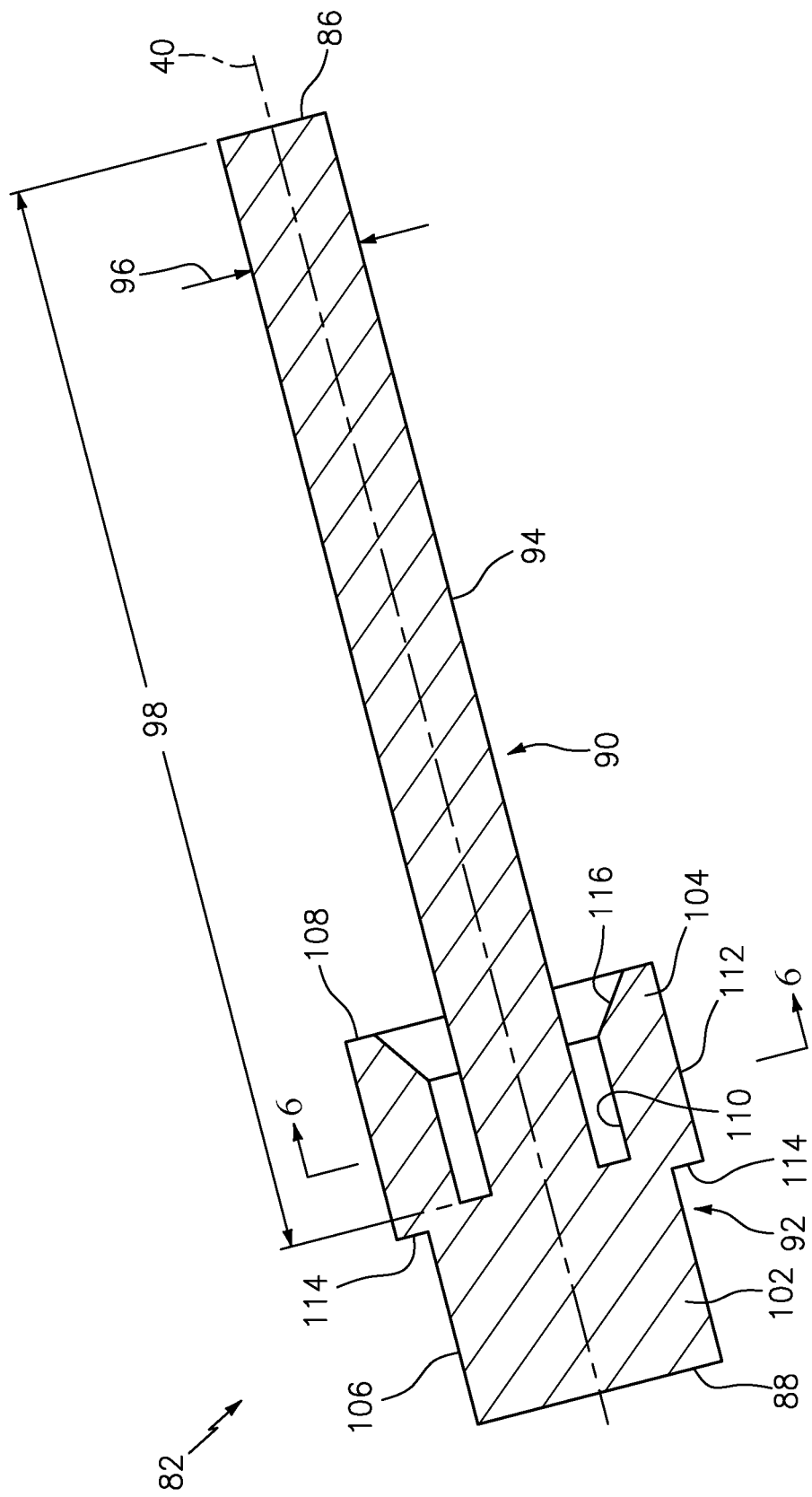
FIG. 5 is a side sectional illustration of a plug.

Referring to FIG. 4, the plug assembly 24 includes a fluid conduit plug 82 and a fluid conduit nut 84. Referring to FIG. 5, the plug 82 extends axially along (e.g., a straight portion of) the axial centerline 40 between and to a distal first (e.g., upstream and/or gravitationally upper) end 86 of the plug 82 and a second (e.g., downstream and/or gravitationally lower) end 88 of the plug 82. The plug 82 of FIG. 5 includes a (e.g., non-threaded) plug protrusion 90 and a plug head 92.

The protrusion 90 is configured as a conduit bore filling (e.g., plugging) member of the plug 82. The protrusion 90 of FIG. 5, for example, is configured as a shaft (e.g., non-threaded, cylindrical rod) of the plug 82 with an (e.g., cylindrical) outer surface 94. The protrusion 90 is connected (e.g., formed integral with) the head 92. The protrusion 90 projects axially along the axial centerline 40 out from the head 92 to a distal end of the protrusion 90, which is also the distal first end 86 of the plug 82.

Figure 6:
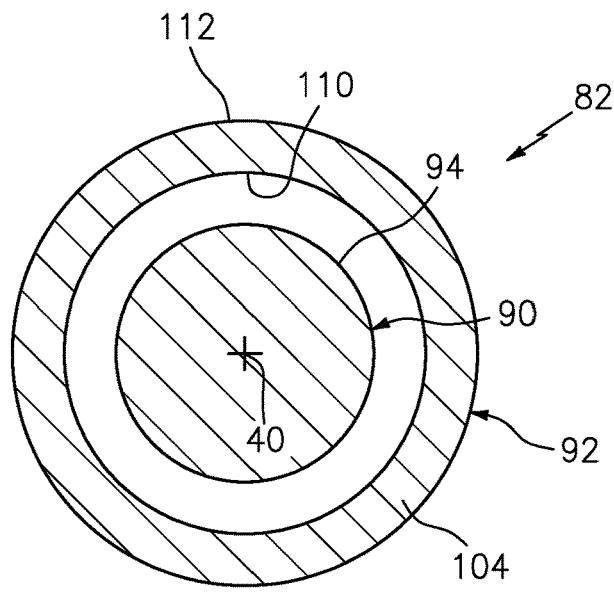
FIG. 6 is a cross-sectional illustration of the plug taken along line 6-6 in FIG. 5.

Referring to FIG. 6, the protrusion 90 and its outer surface 94 may have a circular cross-sectional geometry when viewed, for example, in a plane perpendicular to the axial centerline 40. The protrusion 90 of FIG. 5 has a lateral width 96; e.g., a diameter. This protrusion lateral width 96 may remain uniform (e.g., constant) along an entirety or at least a substantial portion (e.g., at least 80-90%) of an axial length 98 of the protrusion 90. The protrusion lateral width 96 is sized such that the protrusion 90 is operable to slide into/slide within and at least partially (or completely) fill at least a portion of the internal bore 78 as described below; e.g., see FIG. 1. The protrusion lateral width 96, for example, may be slightly less than a lateral width 100 (e.g., diameter) of the internal bore 78 (see FIG. 2), but at least seventy, eighty or ninety percent (70, 80 or 90%) of the internal bore lateral width 78.

The head 92 is configured as a conduit orifice covering (e.g., sealing) member of the plug 82. The head 92 of FIG. 5, for example, includes a head base 102 and a tubular head flange 104. The head base 102 is arranged at (e.g., on, adjacent or proximate) the plug second end 88. The head base 102 of FIG. 5, for example, extends axially along the axial centerline 40 from the plug second end 88 to the protrusion 90 and the head flange 104. The head base 102 extends radially outward to an (e.g., cylindrical) outer surface 106.

The head flange 104 is connected to (e.g., formed integral with) the head base 102. The head flange 104 extends axially along the axial centerline 40 from the head base 102 to a distal end 108 of the head 92. The head flange 104 extends circumferentially about (e.g., completely around) the axial centerline 40. The head flange 104 may thereby circumscribe and axially overlap a base portion of the protrusion 90. The head flange 104 extends radially from a (e.g., cylindrical) radial inner surface 110 of the head flange 104 to a (e.g., cylindrical) radial outer surface 112 of the head flange 104. An annular (e.g., flat) shelf surface 114 of the head 92 extends radially between and to, and is angularly offset from (e.g., perpendicular to) the base outer surface 106 and the flange outer surface 112.

The head flange 104 includes an annular tapered (e.g., a frustoconical) surface 116. This tapered surface 116 tapers radially inward towards the axial centerline 40 (e.g., to the flange inner surface 110) as the head flange 104 extends axially away from the head distal end 108.

Figure 7:
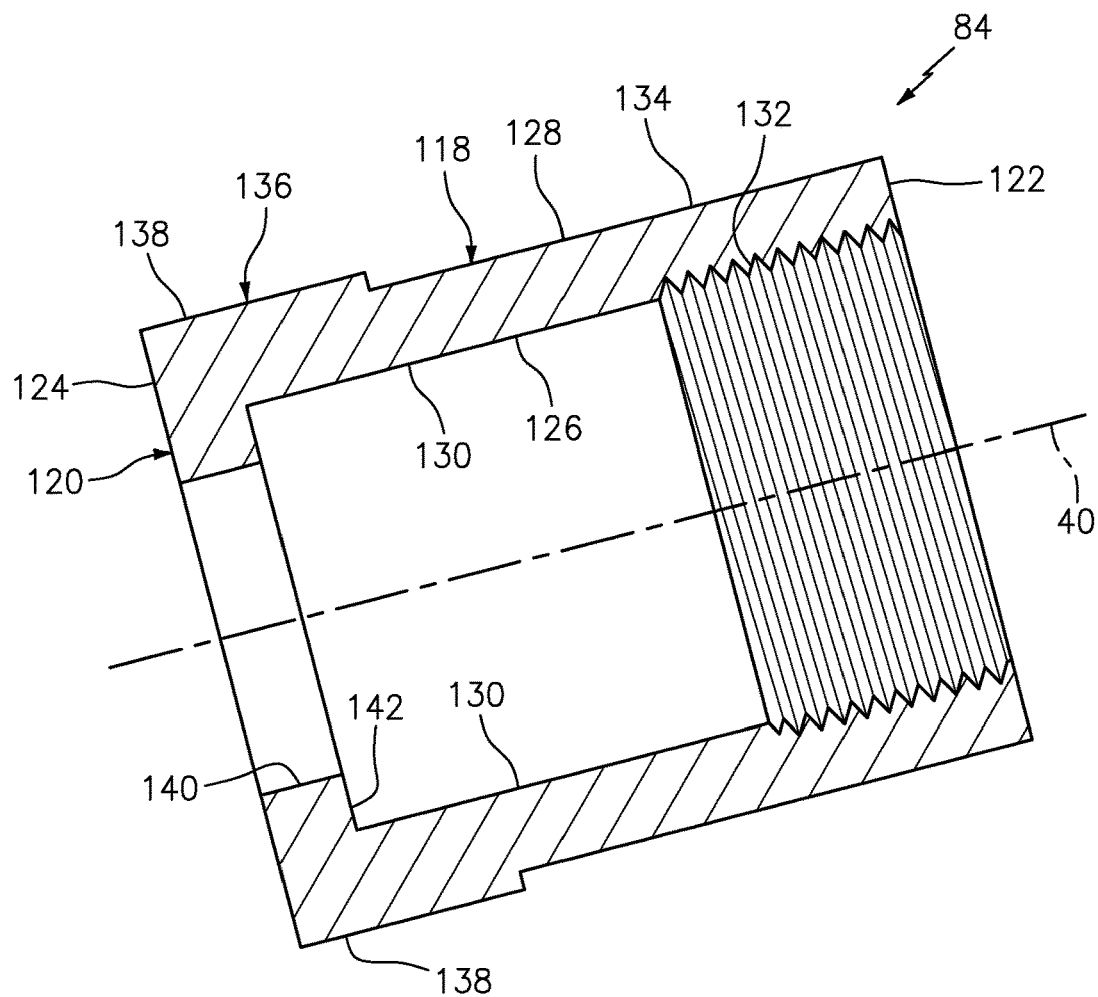
FIG. 7 is a side sectional illustration of a nut.

Referring to FIG. 7, the nut 84 includes a tubular nut sleeve 118 and an annular nut rim 120; e.g., an inner rim. The nut 84 and its sleeve 118 extend axially along the axial centerline 40 between and to a first end 122 of the nut 84 and a second end 124 of the nut 84. The nut 84 and each of its components 118 and 120 extend circumferentially about (e.g., completely around) the axial centerline 40.

Figure 8:
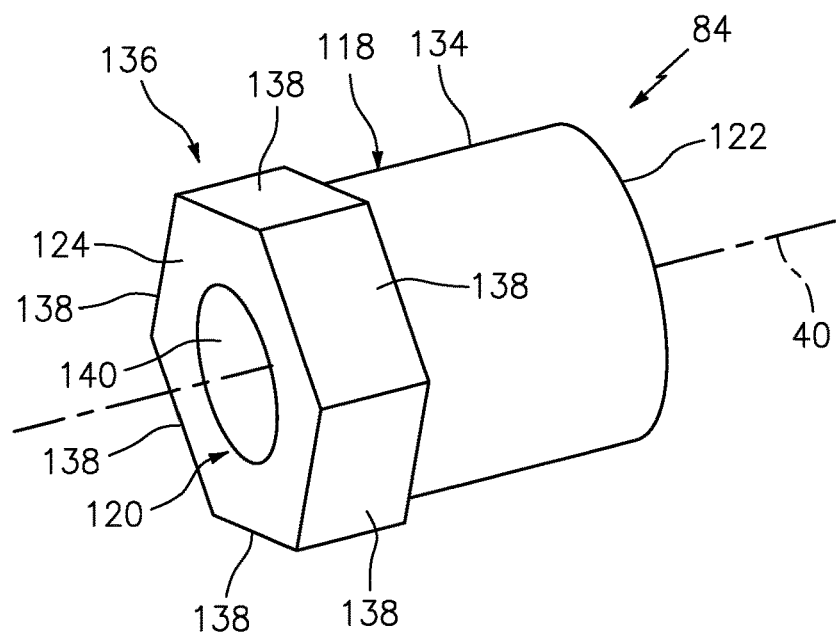
FIG. 8 is a perspective illustration of the nut.

The nut sleeve 118 extends radially between and to a radial inner side 126 and a radial outer side 128. The nut sleeve 118 includes a (e.g., smooth, cylindrical) radial inner surface 130 at the sleeve inner side 126. The nut sleeve 118 also includes an internal thread 132 at the sleeve inner side 126 and the nut first end 122. The nut sleeve 118 includes a (e.g., smooth, cylindrical) radial inner surface 134 at the sleeve outer side 128 and the nut first end 122. The nut sleeve 118 also includes a wrenching feature 136 at the sleeve outer side 128 and the nut second end 124. An outer periphery of the wrenching feature 136 may be formed by one or more flats 138; e.g., flat, planar surfaces. The flats 138 of FIG. 8 are arranged circumferentially about the axial centerline 40 to provide the wrenching feature 136 with a polygonal (e.g., a hexagonal) cross-sectional geometry when viewed, for example, in a plane perpendicular to the axial centerline 40.

The nut rim 120 of FIG. 7 is connected to (e.g., formed integral with) the nut sleeve 118 at (e.g., on, adjacent or proximate) the nut second end 124. The nut rim 120 projects radially inward from the nut sleeve 118 to an annular distal end surface 140. The nut rim 120 includes an annular shelf surface 142, which extends radially between and is angularly offset from (e.g., perpendicular to) the rim end surface 140 and the base inner surface 130.

Referring to FIG. 1, during fluid system operation, the plug assembly 24 closes the internal bore 78 such that fluid (e.g., lubricant) cannot drain from the fluid reservoir 28 through the fluid conduit 22. In particular, the plug 82 and the nut 84 are mated with the fluid conduit 22. The protrusion 90, for example, is slid axially into the internal bore 78 (with or without being twisted/rotated about the axial centerline 40) until the head flange 104 engages (e.g., contacts) the fluid conduit 22 at its second end 44. The annular tapered surface 116 of the plug 82 may thereby engage (e.g., contact) the annular tapered surface 68 of the fluid conduit 22. The nut 84 is mounted onto the head 92 and the fluid conduit 22. The head base 102, for example, projects through a bore of the nut 84 and out an opening formed by the nut rim 120. The internal thread 132 is mated with the external thread 66 such that the nut 84 may be threaded onto the fluid conduit 22. The nut 84 is tightened onto the fluid conduit 22 until the head flange 104 is sandwiched axially between the nut rim 120 and the fluid conduit 22. In particular, the shelf surface 114 is pressed axially against the shelf surface 142. The tapered surface 68 is seated and pressed against the tapered surface 116, which thereby provides a cone seal interface between the plug 82 and the fluid conduit 22. The head 92 may thereby close off and seal an opening (e.g., a drain orifice) in the conduit second end 44 to the internal bore 78.

Under certain conditions, the fluid conduit 22 and thereby the fluid within the fluid conduit 22 may be subject to relatively high temperatures during fluid system operation. For example, where the fluid system is included in a gas turbine engine or another rotational equipment application, gas (e.g., air) in a plenum 144 surrounding the fluid conduit 22 and adjacent the fluid system structure 26 may be heated to an elevated temperature. When the fluid within the fluid conduit 22 is heated to or above a certain temperature, some of that fluid may partially solidify (e.g., coke) and leave particulate deposits on the fluid conduit 22 within the internal bore 78.

To reduce or prevent accumulation of deposits within at least a portion of the fluid conduit 22, the protrusion 90 projects axially (e.g., partially) into the internal bore 78 to the distal plug first end 86. In the embodiment of FIG. 1, the plug first end 86 is located at the intermediate conduit portion 50. Therefore, in addition to closing the opening to the internal bore 78, the plug 82 also displaces volume within the internal bore 78 via the protrusion 90. By displacing volume within the internal bore 78, the protrusion 90 reduces the amount of fluid (e.g., lubricant) that can remain within the internal bore 78 during fluid system operation.

The plug 82 of FIG. 1, for example, may prevent any or a significant amount of the fluid from being within at least a portion of the internal bore 78; e.g., a portion of the internal bore 78 within the second conduit portion 48. The plug assembly 24 of FIG. 1 is therefore operable to reduce fluid deposits from accumulating within the internal bore 78 during fluid system operation.

In some embodiments, referring to FIG. 5, the protrusion outer surface 94 may extend axially (e.g., uninterrupted) along at least one-half of the protrusion axial length 98; e.g., at least six-tenths, seven-tenths, eight-tenths, nine-tenths or an entirety of the protrusion axial length 98. The protrusion outer surface 94 of FIG. 5, for example, extends axially (e.g., uninterrupted) along the entirety of the protrusion axial length 98. The protrusion outer surface 94, however, may extend axially (e.g., uninterrupted) along at least eight-tenths or nine-tenths of the protrusion 90 where, for example, the protrusion is chamfered at the first end 86 (e.g., see chamfered end of FIG. 9). The present disclosure, of course, is not limited to the foregoing exemplary outer surface axial dimensions.

Figure 9:
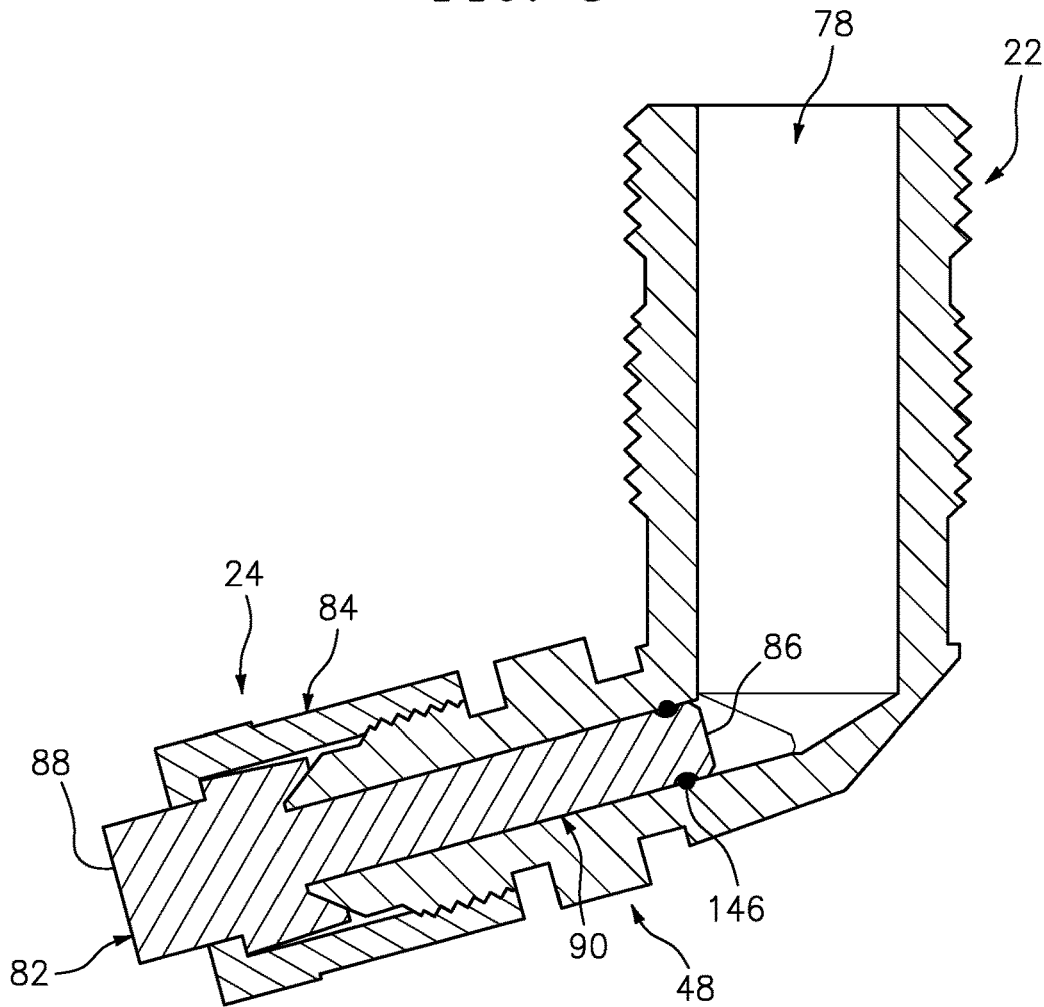
FIG. 9 is a side sectional illustration of another plug assembly mated with another fluid conduit.

In some embodiments, referring to FIG. 9, the plug assembly 24 may also include at least one (or only one) annular seal element 146 such as, but not limited to, an O-ring. The seal element 146 may be seated partially in an annular groove in the protrusion 90. The seal element 146 is arranged within the internal bore 78 with the protrusion 90, and is configured to sealingly engage (e.g., be compressed radially between and/or contact) the protrusion 90 and the fluid conduit 22. The seal element 146 may thereby seal a (e.g., annular) gap between the protrusion 90 and the fluid conduit 22. Such a seal interface may further reduce the amount of fluid that can reside within the internal bore 78, particularly within the second conduit portion 48 downstream of the seal element 146. In addition, the seal element 146 may also prevent or reduce fluid leakage out from the conduit opening after the nut 84 is removed and the head 92 is initially moved away from the fluid conduit 22. Maintenance personal may therefore have more time to position a catch basis, a funnel and/or another device at the conduit second end 44 for catching the fluid which flows through the conduit opening after removal of the plug 82.

In some embodiments, referring to FIG. 9, the seal element 146 may be positioned at or near the plug first end 86. The present disclosure, however, is not limited to such an exemplary seal element position.

Figure 10:
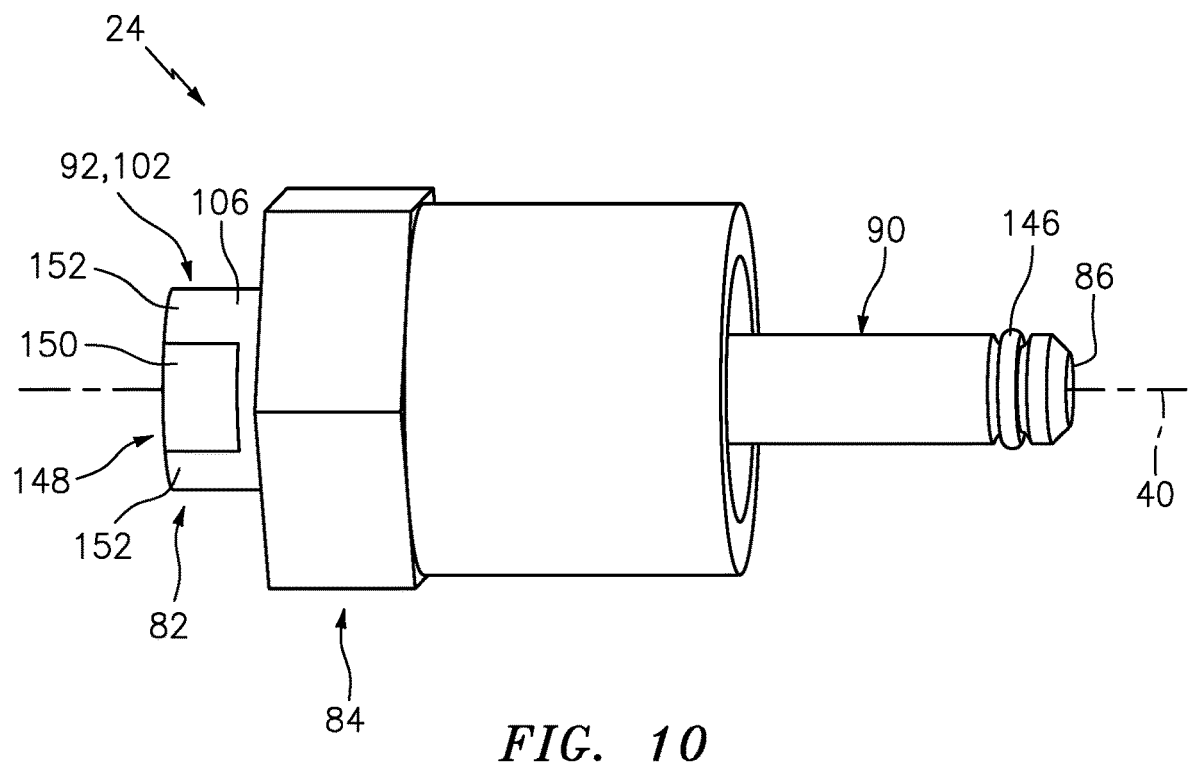
FIG. 10 is a perspective illustration of the plug assembly of FIG. 9.
Figure 11:
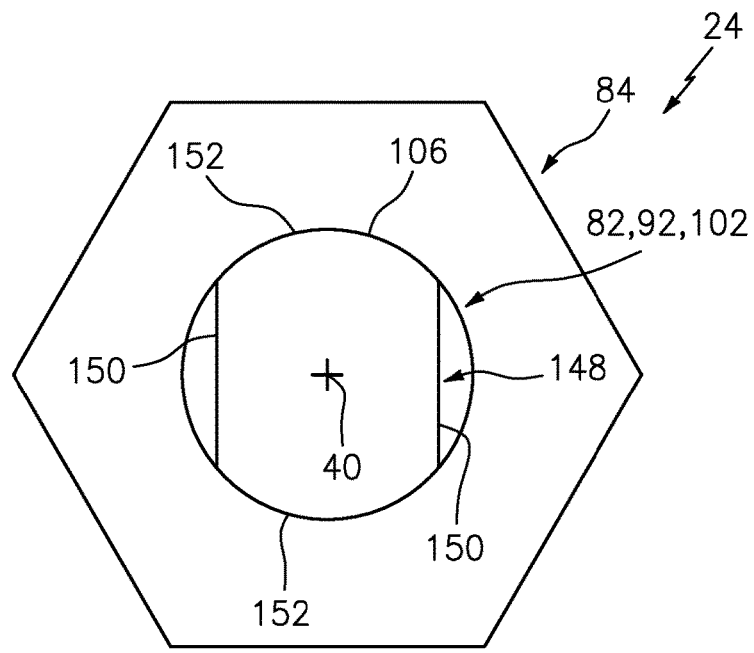
FIG. 11 is an end view illustration of the plug assembly of FIG. 10.

In some embodiments, referring to FIGS. 10 and 11, the plug 82 may include a wrenching feature 148. This wrenching feature 148 may be configured as part of/integrated into the head 92 and, more particularly, the head base 102. With this configuration, the wrenching feature 148 may be exposed even when the nut 84, for example, is still holding/securing the plug 82 with the fluid conduit 22 (see FIG. 1). The wrenching feature 148 may thereby be engaged by a tool (e.g., a wrench, pliers, etc.), and the plug 82 may be rotated about its axial centerline 40 before removal. Such rotation may serve to break deposits which may temporarily bond the protrusion 90 to the fluid conduit 22 (see FIG. 1).

The wrenching feature 148 of FIGS. 10 and 11 includes one or more flats 150; e.g., flat, planar surfaces. Referring to FIG. 11, the flats 150 are arranged on opposing sides of the head base 102. An arcuate portion 152 of the outer surface 106 is laterally between and extends circumferentially between respective sides of the flats 150. The present disclosure, however, is not limited to such an exemplary wrenching feature. For example, in other embodiments, the wrenching feature 148 may provide the outer periphery of the plug 82 with a polygonal (e.g., hexagonal) cross-sectional geometry or otherwise.

Figure 12:
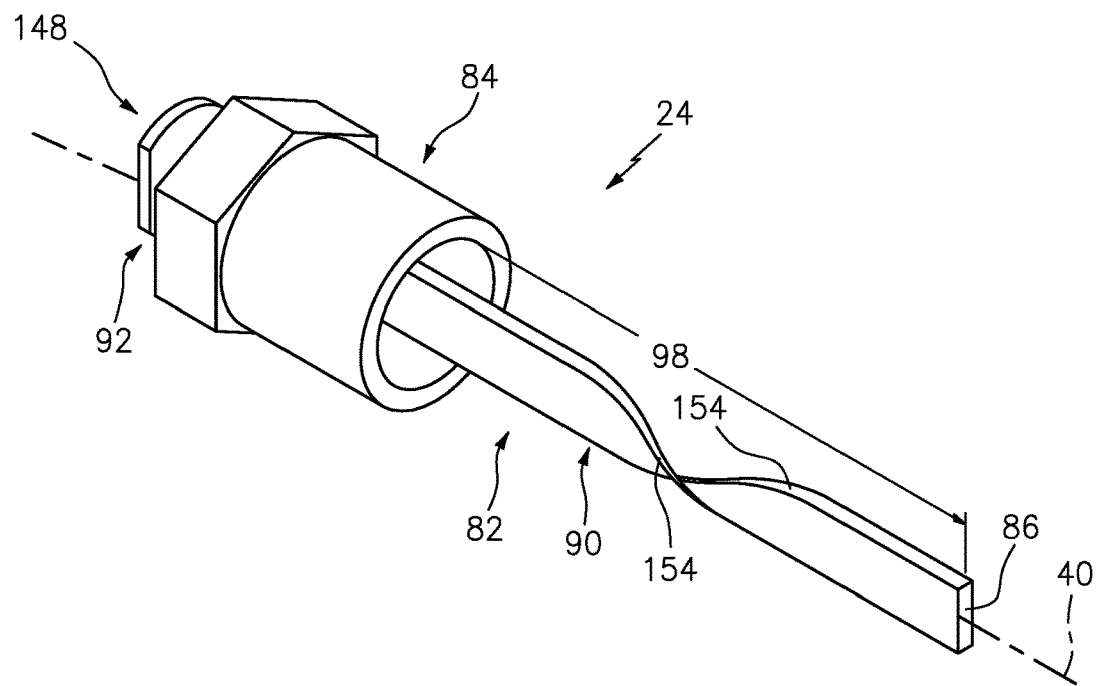
FIG. 12 is a perspective illustration of another plug assembly.

In some embodiments, referring to FIG. 12, at least a portion of or the entire axial length 98 of the protrusion 90 may be twisted about the axial centerline 40. The protrusion 90, for example, may have an auger, drill bit, spiral and/or helical configuration. A direction of the twist in the protrusion 90 may be opposite a direction of rotation of the internal thread 132 (see FIG. 7). Of course, the present disclosure is not limited to such an exemplary arrangement. For example, in other embodiments, the direction of the twist in the protrusion 90 may be the same as the direction of rotation of the internal thread 132 (see FIG. 7).

With the twisted configuration of FIG. 12, one or more of the edges 154 of the protrusion 90 may each function as a scrapper blade within the internal bore 78 (see FIG. 1). The protrusion edge(s) 154, for example, may be moved within the fluid conduit 22 and scrape off any fluid deposits within the internal bore 78 (see FIG. 1). For example, before removing the protrusion 90 from the internal bore 78 (see FIG. 1), the plug 82 and, thus, the protrusion 90 may be twisted (e.g., at least 180° about the axial centerline 40) using the wrenching feature 148 such that the edge(s) 154 scrape along (e.g., a circumferential entirety of; 360° around) respective interior surface(s) forming the internal bore 78 (see FIG. 1). Such scraping may dislodge/scrape off fluid particulates (e.g., coked lubricant) from the interior bore surfaces. This twisting may also or alternatively be performed while the protrusion 90 is being removed (e.g., slide out axially) from the internal bore 78 (see FIG. 1). Of course, in still other embodiments, the plug 82 and its protrusion 90 may be removed from the internal bore 78 (see FIG. 1) without any plug twisting movement.

In some embodiments, at least a portion or the entire axial length 98 of the protrusion 90 may have a polygonal cross-sectional geometry when viewed, for example, in a plane perpendicular to the axial centerline 40. The protrusion 90 of FIG. 12, for example, has a rectangular cross-sectional geometry. This protrusion 90 may be constructed from or otherwise include a length of flexible metal sheet material (e.g., thin steel plate). The protrusion 90 and its rectangular cross-sectional geometry of FIG. 12 are twisted at least one-hundred and eighty degrees (180°) about the axial centerline 40 along a select portion of the axial length 98 of the protrusion 90.

Figure 13:
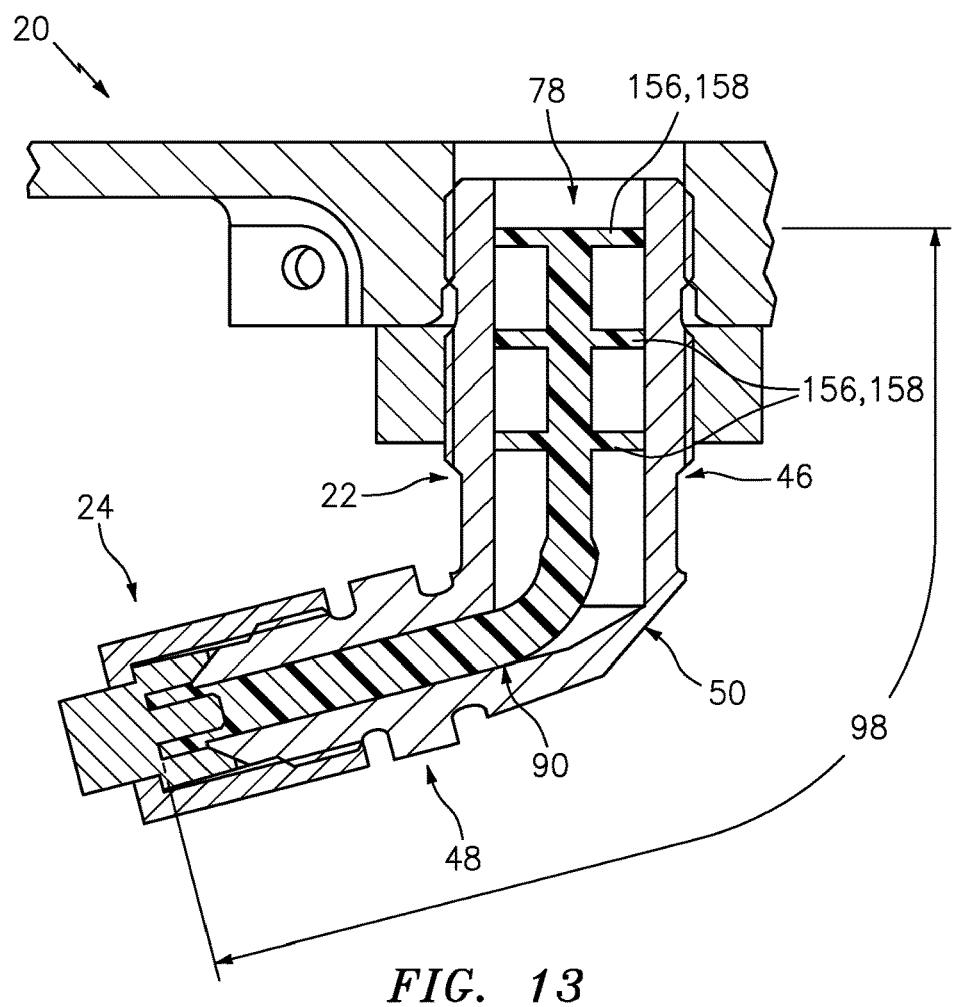
FIG. 13 is a side sectional illustration of the fluid system assembly with another plug assembly.

In some embodiments, referring to FIG. 13, at least a portion or the entire axial length 98 of the protrusion 90 may be constructed from flexible material. An example of such flexible material is ductile, pliable steel wire. Another example of the flexible material is silicon. With such a construction, at least a portion of the protrusion 90 may deform (e.g., bend) so as to pass through the intermediate conduit portion 50 and into the first conduit portion 46. The present disclosure, of course, is not limited to the foregoing exemplary flexible materials.

In some embodiments, the protrusion 90 may include one or more annular members 156. The protrusion 90 of FIG. 13, for example, is configured with one or more flexible wire bristle packs 158. These bristle packs 158 are arranged along the axial length 98 of the protrusion 90. Each of the bristle packs 158 is configured to radially engage the fluid conduit 22. The bristle packs 158 may thereby scrape off fluid deposits when the protrusion 90 is removed from the internal bore 78.

Any one of the plug assemblies 24/plugs 82 disclosed herein may be configured with a wrenching feature such as, but not limited to, the wrenching feature 148 of FIGS. 10 and 11. The plug assembly 24 and its plug of FIG. 13, for example, may be configured with one or more wrenching feature flats as described above with respect to FIGS. 10 and 11. Of course, in other embodiments, any one or more of the plug assemblies 24/plugs 82 may be configured without a wrenching feature.

Figure 14:
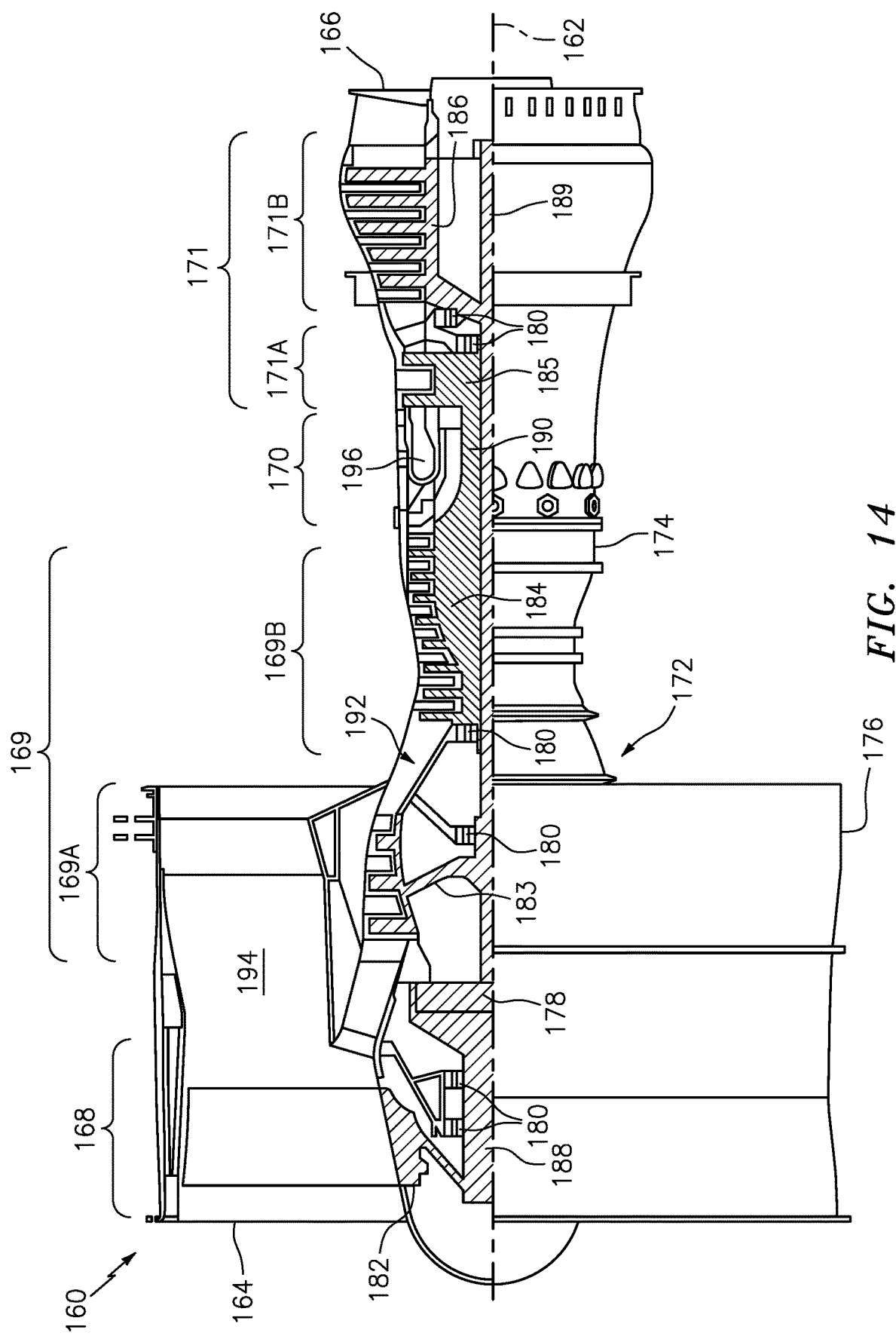
FIG. 14 is a side cutaway illustration of a gas turbine engine.

The fluid system assembly 20 may be included as part of and/or otherwise configured with various pieces of equipment, including various types and configurations of rotational equipment. The fluid system assembly 10, for example, may be included as part of and/or otherwise configured with a gas turbine engine for an aircraft propulsion system. FIG. 14 illustrates an exemplary embodiment of such a gas turbine engine 160, which is configured as a geared turbofan gas turbine engine.

The turbine engine 160 of FIG. 14 extends along an axis 162 between an upstream airflow inlet 164 and a downstream airflow exhaust 166. The turbine engine 160 includes a fan section 168, a compressor section 169, a combustor section 170 and a turbine section 171. The compressor section 169 includes a low pressure compressor (LPC) section 169A and a high pressure compressor (HPC) section 169B. The turbine section 171 includes a high pressure turbine (HPT) section 171A and a low pressure turbine (LPT) section 171B.

The engine sections 168-171B are arranged sequentially along the axis 162 within an engine housing 172. This engine housing 172 includes an inner case 174 (e.g., a core case) and an outer case 176 (e.g., a fan case). The inner case 174 may house one or more of the engine sections 169A-171B; e.g., an engine core. The outer case 176 may house at least the fan section 168. The engine housing 172 and, more particularly for example, the inner case 174 may include or otherwise be configured with the fluid system structure 26 of FIG. 1. Alternatively, the fluid system structure 26 of FIG. 1 may be configured as a part of another apparatus within the turbine engine 160. The fluid system structure 26 of FIG. 1, for example, may be configured as a case/housing for a gear train 178 and/or a bearing 180 in the turbine engine 160 of FIG. 14.

Each of the engine sections 168, 169A, 169B, 171A and 171B of FIG. 14 includes a respective rotor 182-186. Each of these rotors 182-186 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 182 is connected to the gear train 178, for example, through a fan shaft 188. The gear train 178 and the LPC rotor 183 are connected to and driven by the LPT rotor 186 through a low speed shaft 189. The HPC rotor 184 is connected to and driven by the HPT rotor 185 through a high speed shaft 190. The shafts 188-190 are rotatably supported by a plurality of the bearings 180. Each of these bearings 180 is connected to the engine housing 172 by at least one stationary structure such as, for example, an annular support strut.

During operation, air enters the turbine engine 160 through the airflow inlet 164. This air is directed through the fan section 168 and into a core gas path 192 and a bypass gas path 194. The core gas path 192 extends sequentially through the engine sections 169A-171B. The bypass gas path 194 extends away from the fan section 168 through a bypass duct, which circumscribes and bypasses the engine core. The air within the core gas path 192 may be referred to as "core air". The air within the bypass gas path 194 may be referred to as "bypass air".

The core air is compressed by the compressor rotors 183 and 184, and directed into a combustion chamber 196 of a combustor in the combustor section 170. Fuel is injected into the combustion chamber 196 and mixed with the compressed core air to provide a fuel-air mixture. This fuel air mixture is ignited and combustion products thereof flow through and sequentially cause the turbine rotors 185 and 186 to rotate. The rotation of the turbine rotors 185 and 186 respectively drive rotation of the compressor rotors 184 and 183 and, thus, compression of the air received from a core airflow inlet. The rotation of the turbine rotor 186 also drives rotation of the fan rotor 182, which propels bypass air through and out of the bypass gas path 194. The propulsion of the bypass air may account for a majority of thrust generated by the turbine engine 160, e.g., more than seventy-five percent (75%) of engine thrust. The turbine engine 160 of the present disclosure, however, is not limited to the foregoing exemplary thrust ratio.

The fluid system assembly 20 may be included in various aircraft and industrial turbine engines other than the one described above as well as in other types of rotational and non-rotational equipment. The fluid system assembly 20, for example, may be included in a geared turbine engine where a gear train connects one or more shafts to one or more rotors in a fan section, a compressor section and/or any other engine section. Alternatively, the fluid system assembly 20 may be included in a turbine engine configured without a gear train. The fluid system assembly 20 may be included in a geared or non-geared turbine engine configured with a single spool, with two spools (e.g., see FIG. 14), or with more than two spools. The turbine engine 160 may be configured as a turbofan engine, a turbojet engine, a propfan engine, a pusher fan engine or any other type of turbine engine. The present disclosure therefore is not limited to any particular types or configurations of turbine engine. Furthermore, the fluid system assembly 20 of the present disclosure may also be utilized for non-turbine engine applications. The fluid system assembly 20, for example, may be utilized for any application where it is desirable to functional relocate a closable fluid orifice and/or plug an internal bore 78.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a fluid system, comprising:
a fluid conduit with an internal bore, the internal bore comprising a smooth-walled internal bore; and
a plug including a protrusion and a head, the protrusion connected to the head and projecting axially along an axial centerline partially into the smooth-walled internal bore to a distal end of the plug, and the head seated against the fluid conduit and sealing an opening in the fluid conduit to the internal bore;
wherein at least a portion of the protrusion is twisted about the axial centerline.

2. The assembly of claim 1, wherein at least a portion of the protrusion has a polygonal cross-sectional geometry.

3. The assembly of claim 1, wherein the head comprises a wrenching feature.

4. The assembly of claim 3, further comprising:
a nut securing the plug to the fluid conduit;
the head projecting axially through an aperture in the nut towards the wrenching feature.

5. The assembly of claim 1, wherein the head is seated against the fluid conduit at a cone seal interface.

6. The assembly of claim 1, further comprising a nut securing the plug to the fluid conduit.

7. The assembly of claim 6, wherein
the nut includes a sleeve and an inner rim;
the sleeve is mated with the fluid conduit at a threaded interface; and
the head is sandwiched axially between the inner rim and an end of the fluid conduit.

8. An assembly for a fluid system, comprising:
a fluid conduit with an internal bore, the internal bore comprising a smooth-walled internal bore; and
a plug including a protrusion and a head, the protrusion connected to the head and projecting axially along an axial centerline partially into the smooth-walled internal bore to a distal end of the plug, and the head seated against the fluid conduit and sealing an opening in the fluid conduit to the internal bore;
wherein the plug further includes a flexible wire bristle pack arranged within the internal bore and attached to the protrusion.

9. The assembly of claim 8, wherein the head comprises a wrenching feature.

10. The assembly of claim 9, further comprising:
a nut securing the plug to the fluid conduit;
the head projecting axially through an aperture in the nut towards the wrenching feature.

11. The assembly of claim 8, wherein the head is seated against the fluid conduit at a cone seal interface.

12. The assembly of claim 8, further comprising a nut securing the plug to the fluid conduit.

13. The assembly of claim 12, wherein
the nut includes a sleeve and an inner rim;
the sleeve is mated with the fluid conduit at a threaded interface; and
the head is sandwiched axially between the inner rim and an end of the fluid conduit.

14. An assembly for a fluid system, comprising:
a fluid conduit with an internal bore, the internal bore comprising a smooth-walled internal bore; and
a plug including a protrusion and a head, the protrusion connected to the head and projecting axially along an axial centerline partially into the smooth-walled internal bore to a distal end of the plug, and the head seated against the fluid conduit and sealing an opening in the fluid conduit to the internal bore;
wherein at least a portion of the axial centerline is non-straight and the protrusion comprises flexible material.

\* \* \* \* \*